US00RE43260E

(19) United States
(12) Reissued Patent
Paalasmaa et al.

(10) Patent Number: US RE43,260 E
(45) Date of Reissued Patent: Mar. 20, 2012

(54) METHOD FOR CLUSTERING AND QUERYING MEDIA ITEMS

(75) Inventors: Joonas Paalasmaa, Helsinki (FI); Jukka-Pekka Salmenkaita, Espoo (FI); Antti Sorvari, Itasalmi (FI); Tapio Tallgren, Kirkkonummi (FI)

(73) Assignee: Nokia Corporation, Espoo (FI)

(21) Appl. No.: 12/150,100

(22) Filed: Apr. 23, 2008

Related U.S. Patent Documents

Reissue of:
(64) Patent No.: 7,313,574
Issued: Dec. 25, 2007
Appl. No.: 10/678,591
Filed: Oct. 2, 2003

(51) Int. Cl.
*G06F 7/00* (2006.01)
*G06F 17/30* (2006.01)
*G09G 5/00* (2006.01)

(52) U.S. Cl. ..... 707/737; 707/999.107; 345/619

(58) Field of Classification Search ..... None
See application file for complete search history.

(56) References Cited

U.S. PATENT DOCUMENTS

| | | | | |
|---|---|---|---|---|
| 5,598,557 | A * | 1/1997 | Doner et al. | 1/1 |
| 5,828,067 | A * | 10/1998 | Rushbrooke et al. | 250/370.11 |
| 6,144,375 | A * | 11/2000 | Jain et al. | 715/251 |
| 6,240,424 | B1 * | 5/2001 | Hirata | 707/749 |
| 6,411,724 | B1 * | 6/2002 | Vaithilingam et al. | 382/100 |
| 6,437,797 | B1 * | 8/2002 | Ota | 345/638 |
| 6,446,083 | B1 * | 9/2002 | Leight et al. | 1/1 |
| 6,480,840 | B2 * | 11/2002 | Zhu et al. | 1/1 |
| 6,606,411 | B1 * | 8/2003 | Loui et al. | 382/224 |
| 6,629,097 | B1 * | 9/2003 | Keith | 1/1 |
| 6,650,779 | B2 * | 11/2003 | Vachtesvanos et al. | 382/228 |
| 6,661,842 | B1 * | 12/2003 | Abousleman | 375/240.11 |
| 6,766,363 | B1 * | 7/2004 | Rothschild | 709/219 |
| 6,829,561 | B2 * | 12/2004 | Keller et al. | 702/179 |
| 6,907,436 | B2 * | 6/2005 | Ye et al. | 1/1 |
| 6,910,049 | B2 * | 6/2005 | Fenton et al. | 1/1 |
| 2002/0087538 | A1 | 7/2002 | Abdel-Mottaleb et al. | |
| 2002/0188602 | A1 * | 12/2002 | Stubler et al. | 707/3 |
| 2003/0009469 | A1 * | 1/2003 | Platt et al. | 707/100 |
| 2003/0084065 | A1 | 5/2003 | Lin et al. | |
| 2003/0195883 | A1 * | 10/2003 | Mojsilovic et al. | 707/6 |

FOREIGN PATENT DOCUMENTS

| | | |
|---|---|---|
| JP | 5128166 | 5/1993 |
| JP | 2003242004 | 8/2003 |
| JP | 2003271617 | 9/2003 |
| WO | WO 02/057959 | 7/2002 |

OTHER PUBLICATIONS

English abstract for JP 2003271617, published Sep. 26, 2003.

(Continued)

*Primary Examiner* — Michael Hicks
(74) *Attorney, Agent, or Firm* — Ware, Fressola, Van Der Sluys & Adolphson LLP

(57) ABSTRACT

The present invention relates to managing media items in data processing terminals. More particularly, the present invention is directed to a method, a device and a computer program product for arranging, viewing and querying media items organized in hierarchical multidimensional clusters in mobile terminals. Media items are arranged by clustering with multiple dimensions, wherein they are queried by defining the first entry for one dimension, wherein the next entry is based on the other dimension from the media items fulfilling the first entry.

30 Claims, 3 Drawing Sheets

OTHER PUBLICATIONS

English abstract for JP 2003242004, published Aug. 29, 2003.
English abstract for JP 5128166, published May 25, 1993.
Loui, et al., Automated Event Clustering and Quality Screening of Consumer Pictures for Digital Albuming, IEEE Transactions of Multimedia, vol. 5, No. 3, Sep. 2003.
Shen, et al., Personal Digital Historian: Story Sharing Around the Table, Interactions, Mar.+Apr. 2003.
Stent et al., Using Event Segmentation to Improve Indexing of Consumer Photographs, SIGIR'01, Sep. 2001, 59-65.

* cited by examiner

METHOD FOR CLUSTERING AND QUERYING MEDIA ITEMS

Matter enclosed in heavy brackets [ ] appears in the original patent but forms no part of this reissue specification; matter printed in italics indicates the additions made by reissue.

FIELD OF THE INVENTION

The present invention relates to managing media items in data processing terminals. More particularly, the present invention is directed to a method, a device and a computer program product for arranging, viewing and querying media items organized in hierarchical multidimensional clusters in mobile terminals.

BACKGROUND OF THE INVENTION

Software applications that manage media collections have become widely adopted as the amount of digital media, including images, has grown. State-of-the-art programs utilize metadata, or information about the media items managed, to help categorizing media collection. Prior art has concentrated on solutions that typically work on personal computers with associated display and other user interface capabilities. Development of mobile communication and computing technology, however, has made it possible to have similar media collections also in mobile personal communication devices with more constrained user interface capabilities.

There are software applications, for example Adobe Album®, that are developed for managing media collections that are stored in personal computers. One example of the prior art techniques is presented in international publication WO 02/057959A2 "Digital media management apparatus and methods" by Adobe Systems. The publication presents a method and an apparatus for managing, finding and displaying objects, such as digital images. The objects are associated with descriptive textual and numeric data ("metadata") and stored in a relational database from which they can be selected, sorted and found. These objects can be searched for and displayed according to the degree to which their metadata matches the search criteria. Objects that are in the different match groups can be differentiated from one another in the display area by visual cues, such as being displayed in front of different background colors or patterns.

One example of a method for managing media objects is presented in publication US2003/0009469A1 "Managing media objects in a database" by Microsoft Corporation. The publication presents a method and an apparatus for organizing media objects in a database using contextual information for a media object and known media objects, categories, indexes and searches, to arrive at an inference for cataloging the media object in the database. The method and the apparatus are provided for clustering media objects by forming groups of unlabeled data and applying a distance metric to said group. Media objects are automatically organized into various collections by clustering images that are taken near each other in time. A user interface may include one image per collection, where the image is shown to the user. If the user is searching for an image, the user views the images respectively representing collections of images and selects a collection that appears to relate to the desired image. Once a collection is selected, the images corresponding to the collection are shown to the user.

It can be seen that the above-described methods suit personal computers well, but have usability and operational problems if transferred into mobile environment. The existing methods are not that feasible in all mobile terminal categories due to being dependent on user's capability to view a display of considerable size and to select media items, categories etc. by point-and-click methods, such as a mouse. However, it would be highly preferable for the end-user to have corresponding functionality in a personal mobile terminal, thus providing users with access to their media collections even when the personal computers are not accessible.

In mobile terminals the media query problems are usually solved by folder-based approach in local storage (memory card or similar), but this has all the same limitations as the folder-based approach in the desktop environment. In the prior art methods the media query problem in a mobile terminal is solved by an access to a remote media collection via a mobile net connection, wherein the user interface logic (use of categories, keywords, etc.) is handled in the server-side. This approach has the benefit of being potentially able to incorporate very advanced metadata-assisted queries, providing the appropriate logic has been implemented in the server-side. However, this approach is not plausible if the network connection is not available for some reason.

For the above-mentioned reasons it is necessary to develop a new method for managing large amounts of media items. The method should be reasonably easy to use even in small displays and it should provide practical access only to limited selection mechanisms. The current invention is a client-side approach and the implementation can be carried out in the mobile device.

SUMMARY OF THE INVENTION

The current invention presents a method and a device and a computer program product for managing media items in mobile terminals. Particularly the current invention focuses on arranging, viewing and querying media items organized in hierarchical multidimensional clusters in mobile terminals, which overcome user interface constraints for metadata-assisted media query in mobile terminals. The invention presents a method for multidimensional clustering and for querying the media items from said clusters and for automatically selecting the depth of cluster hierarchy. The present invention also provides a user interface with a query mechanism to be used with clusters.

Due to the invention the media items are provided with descriptive information, a dimension, wherein the media items that have one descriptive information in common are clustered together. The descriptive information is configured as metadata which can be inserted to media item file manually by the user or automatically. One example of suitable descriptive information is location and time, whereupon the cluster contains media items acquired in a certain place at a certain time.

The cluster comprising the collection of media items is shown to the user. The user interface according to the invention is arranged so that one cluster is shown as a single item among other individual items in the user interface. When the user selects the cluster, another view is opened and the items of that cluster are shown to the user.

The benefit of the clustering is that a list of media items being shown to the user is shorter than in the prior art solution (where all the items are shown in one list), which mitigates the limited display capabilities of mobile terminals. The clustering also helps for collecting media items being somehow linked depending on the descriptive information, logically to the same view. It also offers enough information for the user to quickly see the content of the cluster. Cluster naming facilitates organizing the clusters and the media items to the media collections.

A media manager according to the invention is available anytime and anywhere, when implemented in a mobile terminal. The specific user interface takes into account the limitations of display capabilities of a mobile terminal and reduces them. The media manager also enables the end-users to construct complex queries only with a limited "point-and-click", which further creates a chance for automatic adaptation of media query based on the user's previous query behavior and thus reducing the end-users' query formation effort in subsequent query formation situations.

The preferred embodiments of the invention are set forth in the drawings, in the detailed description which follows, and in the appended claims. Further objects and advantages of the invention are also considered in the description. The invention itself is defined with particularity in the claims.

DETAILED DESCRIPTION OF THE INVENTION

Figure 4:
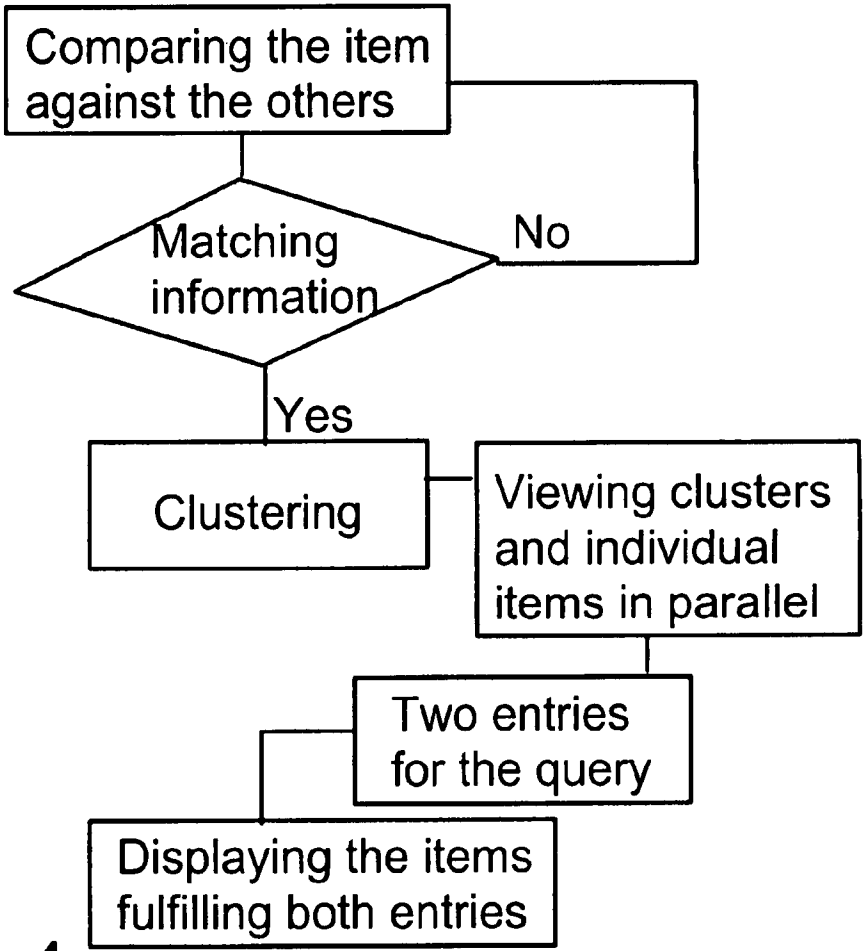
FIG. 4 presents the method according to the invention as a simplified flowchart.

The current invention applies methods of data mining and clustering to automatically assist end-users of mobile terminals to generate complex media queries with little effort. The invention is very preferable and advantageous when considering mobile terminals with personal media management software capability and the severe limits of the available user interface technology in those terminals. In practice the invention enables utilization of complex categorization schemes, including deep multidimensional metadata hierarchies to select desired parts of media collection in a mobile device. The method according to the invention is presented as a very simplified flowchart in FIG. 4. The method according to the invention can be used with different types of media items, but images are used in the following example.

Forming Groups of Media Items

It is possible to divide images into groups by clustering them in a time-space coordinate system. However, applying multidimensional clustering where time and space coordinates are considered simultaneously may create confusing results. According to the invention, a stepwise clustering is applied where the images are clustered by date and by location into final groups. By using this solution, the user better understands the logic behind grouping and complexity can be avoided.

The following is an example of a use of the method. The variables can change due to the situation, wherein they should not be considered as limitations.

When an image is taken, it is provided with metadata comprising descriptive information of the image. Then other images or clusters are searched for. Searching focuses on images or clusters taken less than X meters away from the place the current image was taken at and taken on the same day, or the searching can be done by comparing other descriptive information of the items. If that kind of an image or cluster is found, a cluster containing the former images and the new one is created.

If there is no precise location information available, clusters can also be formed by using only cell ID data by forming a cluster of images taken on the same day in the same cell. If the user has identified (e.g. using landmarks management application) that a group of cell IDs corresponds to one named location (e.g. Summer cottage), then all images taken during the same day in the identified group of cells can form a cluster. Examples of other available location-related information that can be used are location area code (GSM), country code (GSM) and service area identification (WCDMA).

Figure 1:
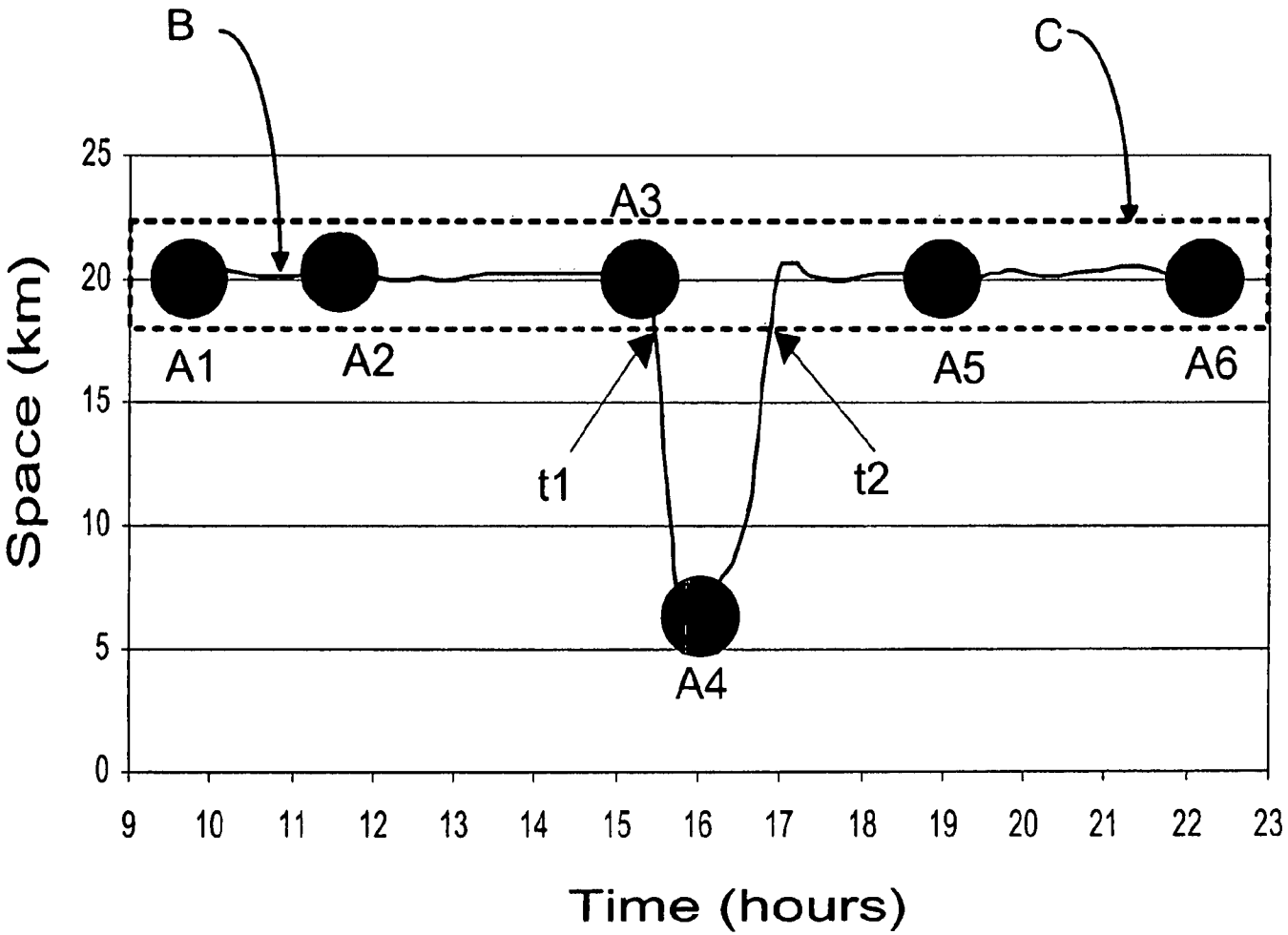
FIG. 1 visualizes a cluster area and the changing location of the user.

Images that are temporally inside a relatively tight cluster but do not belong to it can also be added to the cluster. In the example situation a man is working on a building project at a summer cottage and takes a few pictures there. In the middle of the day he decides to drive to the nearby shop to buy groceries. At the shop he snaps a picture of a funny misspelled sign. The picture snapped at the shop can be added to the summer cottage cluster, because it strongly relates to summer cottage pictures of that day. FIG. 1 visualizes the situation. The points marked with letters A1-A6 indicate snapped images, the curve B between the points A1-A6 indicates the location of the user, and the rectangle with the dotted line defines the cluster area C.

Pictures that are temporally inside a cluster, but do not belong to it, shall not just be added to the cluster. For instance, in a situation where some pictures are taken at home in the morning, some at work during the day, and then in the evening more pictures are taken at home, it is obvious that pictures taken at home fonts a cluster, but pictures snapped at work should not be added to it. Pictures that were taken temporally inside a cluster can be added to it, if the time period of the user being away from the cluster area is not too long. It should also be noticed that the distances between the locations where the pictures were taken and the centroid of a cluster should not be too long.

One possible way of defining whether a picture can be added to a cluster is to check whether the picture fulfills the following conditions:

1. The picture must be temporally inside a cluster.

$$2.\ \int_{t1}^{t2} \mathrm{dist}(t)\,dt \le n,$$

where dist(t) is the distance between the user and the center of the cluster at time t. t1 is the time the user left the cluster area C and t2 is the time the user re-entered it (see FIG. 1). "n" refers to some fixed adaptable limit value.

Location of the user can be tracked several ways, for example by GPS device. The GPS device can be integrated to the device of the invention. The location data can be acquired e.g. at the time of taking the image or periodically. If the location data is not available, the location can be tracked with e.g. cell ID. The automatic tracking of the location can also be done, instead of GPS, by using some other positioning system e.g. different GPS-systems (A-GPS, D-GPS), angle of arrival (AOA), enhanced observed time difference (E-OTD), time difference of arrival (T-DOA), time of arrival (TOA), or the user can define the location coordinates manually. The manually defined coordinates are stored in the location database. The database includes information about the places ("summer cottage") and coordinates corresponding to them. Location of the terminal and tracking should be done all the time.

If the tracking were done only every time a picture is taken, there would be too few tracked places and that would not be sufficient for the calculations.

There can also be other descriptive information instead of location and time in the metadata of the media item. One suitable example is a situation where the first descriptive information is "hobby" and the other descriptive information is fishing, skiing, golfing, etc and/or a time. The queries can then be made according to the entry, e.g., images of fishing in January 2003. Yet another example for first descriptive information is "people" and then the other descriptive information can be wife, co-workers, child, etc. By understanding these examples, it becomes obvious that the descriptive information can concern almost anything.

Naming of Clusters

For identifying clusters, they are labeled with some informative name. Labeling can be automatic by using cluster descriptive information, or manual. One practice is to compose a label of information about the place where the images in the cluster were taken at, the time, when they were taken, and how many images there are in the cluster. If the coordinate information is not available, the closeness can be determined by tracking the number of cell ID changes by using higher-level network information, such as location area codes. By assuming a certain upper limit for the speed in which the terminal can move, time information can also be used to determine closeness. Images taken within a short time period are also taken relatively close to each other.

If coordinate-based position is available and the user has created Landmarks (named coordinate locations) with radius information, the radius information can be utilized in forming clusters in naming clusters. Images inside the Landmark radius are considered to be taken in the same place. Even if images are not taken inside any Landmark, the Landmark name can still be used in naming e.g. "close to Summer cottage" where "Summer cottage" is a landmark name. When naming the cluster, the name of the cluster can be at least partially based on a name queried from a remote server or terminal database that can provide the user with understandable names for locations (based on cluster coordinates/cell ID/location area code etc.). A cluster name can contain more than one location names (e.g. Finland, Helsinki, Ruoholahti).

If most of the images are taken e.g. in Finland and the user takes few images in Spain, it would be preferable to display the country name (Spain) instead of other more detailed location information. On the other hand, if the name of the place where the image was taken is unknown it is also possible to label clusters for example by Group(1), Group (2), etc.

The same naming principles can also be applied to individual images. Naming facilitates organizing the clusters and the images to media collections. The use of different kinds of descriptive information enables different users to see the image information in a way that best suits them.

User Interface

As described earlier, it is preferable to bundle images relating closely to each other—taken on the same day at the substantially same place—up into a cluster. According to the invention, this cluster is preferably shown as a single item among the individual media items in a user interface. On the other words, the user interface shows an array formed by individual media items and clusters. A view, e.g. a list view, comprising one or several clusters can also include individual images that do not belong to any cluster. The cluster can be easily differentiated from the individual images because of its visually different appearance. For example, the appearance can be formed by selecting one or more images of the cluster to be displayed beside the cluster's label and this way by representing the cluster visually. As an example, the selected image could be the one that was first snapped, because then the appearance of the cluster does not change even when new images are snapped and added to the cluster.

Figure 2:
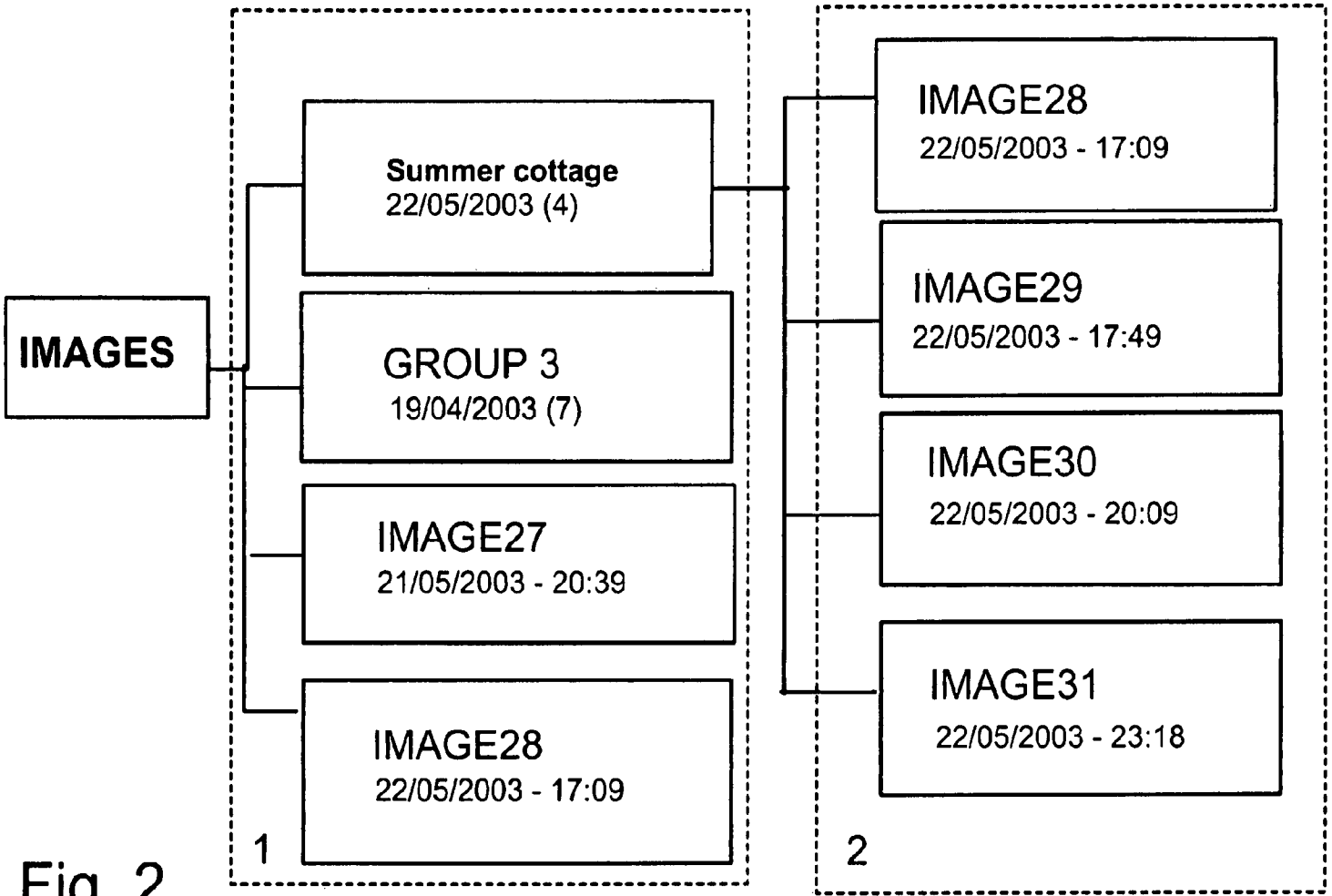
FIG. 2 illustrates the example hierarchy of the media items in the display of a mobile terminal.

As an example, FIG. 2 illustrates the hierarchy of media items in the display of a mobile terminal. In this example the main menu is named "IMAGES" and it displays the array of clusters and the media items in parallel in one view 1. Instead of displaying four images snapped at the summer cottage on the 22$^{nd}$ of May 2003, only one of the four images is displayed as a cluster. The cluster is named oiler the descriptive information that is shared by the media items in it. In this example, the name is a place where the images were taken (Summer cottage). Other information of the cluster can also be shown in the header of the cluster, such as the date (22 May, 2003) and the final number (4 images) of images. Choosing and opening the cluster displays a next view 2 containing the images inside the cluster.

Every now and then a cluster can represent an event. Clusters become events if they are renamed. If "Summer cottage" is renamed as "Flying a kite at summer cottage", the cluster gets a real meaning and thus it is considered as an event. In some cases event information can also be obtained automatically e.g. by using calendar information.

To keep the number of media items or clusters reasonably small, large clusters would be preferred. For this purpose, clustering parameters can be selected accordingly or adapted based on the amount of media items that are present. When large clusters are formed, it is essential to provide the means for accessing the sub-clusters. This can be achieved by applying the clustering process in a step-wise manner. Moreover, the most applicable sub-clustering options can be communicated to the end-user by e.g. visual cues already before the end-user selects that cluster for further examination.

The stepped clustering divides the clustering into two parts. At the first stage of the clustering, the clusters are preferably time and location-combinations, and the list of them is organized based on time. At the second stage of clustering, sub-clusters can be formed. The sub-clusters can be based, for example, on physical presence of people (based on e.g. named Bluetooth-device ID's), on attributes of media items (e.g. "indoors" or "outdoors" based on white-balance settings), on explicit metadata keywords/categories/tags assigned to the media items or on visual similarity of the media items, etc.

One example of the clustering method is presented. There is descriptive information of time and location shown in the tables below. The hierarchy of time information is shown in table A and the hierarchy of location information is shown in table B.

TABLE A

| Year 2000 |
|---|
| January<br>February<br>March<br>. . . |
| Year 2001 |
| January<br>February<br>March<br>. . . |

TABLE B

| Finland |
|---|
| Helsinki<br>Tampere<br>Jyväskylä<br>Sweden |
| Stockholm<br>Estonia |
| Tallinn |

When querying the images, the user at first selects the time information, e.g. February 2000. After this the location information can be selected. According to the invention, the only locations shown in the selection list are the ones fulfilling the February 2000 criteria. In other words, the list, containing only those locations where the user has taken the pictures in February 2000, is shown. If the amount of the information in clusters is different from the information in the query (e.g. months in query and weeks or days in clusters), both images and clusters are shown in the list.

When managing large media collections, the first stage clustering works reasonably well for "recent media items", e.g. only the latest week or month. However, if the end-users focus is not on recent media items, the first stage clustering can be based on e.g. location arranged in alphabetical (or hierarchical, if location hierarchy is available) order and first stage clustering approach is used for sub-clusters.

Next, methods for generating complex media queries for clusters are described. Methods can also be applied in the data-mining technique. The following methods are for 1) identifying descriptive information in a categorization scheme that divides the collection into sub-spaces (clusters) of suitable size and number, and for 2) on-line analysis of user behavior to automatically identify patterns in query formation that can be applied in further queries. When considering an above-mentioned organization of media items, the treelike structure behind it is easy to see. The following methods utilize the treelike structure in queries.

The following schemes can be applied in a situation e.g. where the user has taken several hundreds of images in Finland and tens in several different cities. Few images are taken in Stockholm and Tallinn. When the user selects the location information, the available item could be Helsinki, Tampere, Jyväskylä, Sweden and Estonia or "other". Additional criteria—such as most often used, etc.—can be used as well.

Automatic/Assisted Selection of Hierarchical Depth within a Dimension of Categorization Scheme This scheme is primarily based on calculating such nodes in hierarchical categorization tree that divides the media item space into a suitable number of clusters. This scheme can reduce the number of navigational steps compared to whether the end-user starts from root node or accesses all the leaf nodes in list form.

First, function v(i) is defined for user-perceived annoyance for having to click i times to get a photo from the list. For example, v(i) can be v(i)=i or v(i) can be v(i)=pow(i, 1.5).

Next, V(T) is defined for a tree T as $$V(T)=\text{sum}(v(\text{len}(n))*\text{items}(n):n \text{ in } T)$$

where len(n) is the depth of node n in tree T.

Similarly for a list of trees:

$$V(T_1, \ldots, T_m)=V(T_1)+\ldots+V(T_m))$$

where V indicates user annoyance and $T_1, \ldots, T_m$ are trees.

The list of trees (clusters) is what is presented to the user. Naturally the number of options is wanted to be limited to some reasonable number N (for example 4 to 8).

The user annoyance V can be reduced by providing shortcuts to commonly used parts of the tree. This is done by partitioning the initial tree T (which can be assumed to have a single root) to N subtrees $T_1, \ldots, T_N$. In other words trees $T_1, \ldots, T_N$ are the subtrees of tree T. This partitions all items in the tree, whereupon $V(T_1, \ldots, TN)$ is minimal. It is assumed that subtrees $T_1, \ldots, T_N$ have no common nodes.

The algorithm according to the invention calculates for each node the benefit of choosing that node for a root of a new tree. This is done by defining m subtrees. The benefit of choosing a node as a root is calculated for each node n in subtrees $T_1, \ldots, T_m$:

$$\text{function}=\text{sum}(v(\text{len}(k)+l)*\text{items}(k))-\text{sum}(v(\text{len}(k)*\text{items}(k)))$$

wherein "k" is in "$T_i$" and "n" is in "$T_i$" and "len(n)=l" in $T_i$.

For this function (e.g. for node n in tree $T_i$), the maximum value is chosen, after which $T_i$ is split into two parts, $T_i$ below n (including n) and $T_i$ without said part. Due to this kind of optimization (splitting $T_i$ up), only the values for the nodes above n and below n are needed to be re-calculated.

The calculation is modified depending on past end-user query formation, which has been analyzed for prioritizing the most likely selections by the end-user. The media items are weighted based on whether they are either known or learned to be likely targets of the media item query. For example, high weight (>1) indicates media items that have been previously viewed often, shared or been associated with transactions, and low weight (<1) indicates media items that are obsolete or not related to current context.

Automatic/Assisted Selection of Dimension within Multidimensional Categorization Scheme This scheme is primarily based on analyzing how media items are distributed to the different dimensions of the applied categorization scheme. With this scheme the dimensions that most effectively divide the media item space into suitable sub-spaces can be identified. The preferable implementation utilizes the methods described above in all dimensions before analyzing the distribution. Criteria for the best dimension can be e.g. 1) how evenly the media items are divided into the calculated sub-trees or 2) what is the average number of navigation steps required to reach media items.

The calculation is modified depending on past end-user query formation, which has been analyzed for accounting for personal preferences in query information (for one person it is intuitive to search first for person, then location and for some other person vice versa).

Also in this case media items can be weighted based on whether they are either known or learned to be likely targets of the media item query. For example, high weight (>1) indicates media items that have been previously viewed often, shared, or been associated with transactions, and low weight (<1) indicates media items that are obsolete or not related to current context. The scheme can be modified based on the analysis of how different queries have been previously applied in different contexts.

When using the schemes described above, the end-user scrolls the list up and down to browse categories within one dimension, moves the right/left button to switch between the dimensions (not choosing any), selects (press down) to drill into subcategories within the wanted dimension and selects (soft key) the current category to be part of the query. In order to allow this the device should utilize a hierarchical multidimensional categorization scheme and have navigational means of 6 keys in minimum or similar (e.g. 5-way button, one soft key) to demonstrate the basics of both "X" and "Y" aspects of query formation (X representing how to select automatically/assisted dimension, i.e. "location"/"person"/"event"/and Y representing how to select automatically/assisted the depth within on hierarchical dimension, i.e. "Finland"/"Helsinki"/"Center"/).

Implementation

Figure 3:
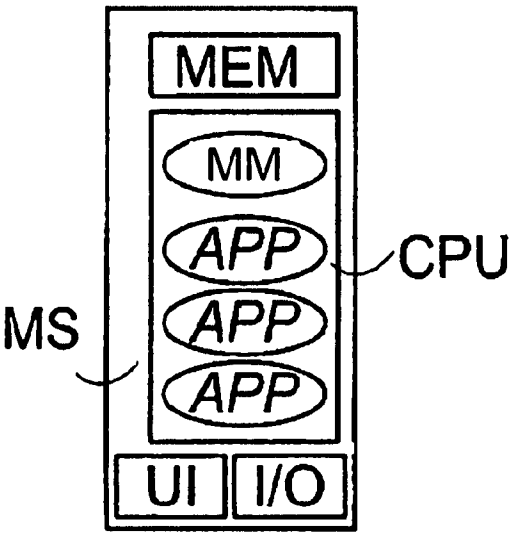
FIG. 3 illustrates one example of the electronic device according to the invention.

FIG. 3 shows an example of the electronic device MS according to the invention. The media item manager MM according to the invention can be implemented as a part of a data processing unit CPU in an electronic device MS. The media manager MM can be within server-side of so called media album servers, and can be reached through a network by the electronic device MS. However, sometimes it is more useful to store the full metadata available in a personal device, for example for privacy reasons, whereupon the client-side implementation of media item manager MM is preferable. It is obvious that the electronic device can comprise some other applications APP as well.

The electronic device MS stores a media collection in the memory MEM. The media collection is acquired, for example, through some known data transfer connection. However, there preferably is a digital camera attached to or integrated in said electronic device MS wherein the images taken with said camera are directly stored into the memory MEM. The media collection is queried and viewed through a user interface UI. The electronic device MS is preferably a terminal with mobile communication and photographing capabilities, e.g. a camera phone.

The foregoing detailed description is provided for clearness of understanding only, and limitation should not necessarily be read therefrom into the claims herein.

The invention claimed is:

1. A method, comprising:

providing individual media items with metadata comprising at least first and second descriptive information;

forming a first cluster of individual media items that have one descriptive information in common;

forming a second cluster of individual media items that have two descriptive information in common;

automatically sub-clustering together media items within a cluster in question when said media items within said cluster in question have further descriptive information in common;

providing a cluster hierarchy comprising at least the first and second clusters and any sub-clusters; and presenting each cluster and any sub-clusters as an individual media item to a user interface.

2. The method according to claim 1, further comprising comparing a first individual media item to a plurality of individual media items or to at least said first and second clusters for determining whether to cluster said first individual media item with at least one of said plurality of individual media items or at least one of said first and second clusters.

3. The method according to claim 1, further comprising naming the cluster in question according to descriptive information the individual media items of the cluster in question have in common.

4. The method according to claim 3, wherein the cluster in question is named and updated manually, wherein the name is also updated to the corresponding storage system.

5. The method according to claim 1, further comprising displaying the cluster in question among the individual media items, but differentiated from the individual media items visually.

6. The method according to claim 1, further comprising managing media items and at least said first and second clusters, wherein managing comprises at least arranging, querying and viewing the media items.

7. The method according to claim 6, wherein querying the media items comprises defining a first entry for one descriptive information wherein a next entry is based on at least one subsequent descriptive information of media items fulfilling the first entry.

8. The method according to claim 7, wherein querying the media items is adapted automatically based on a user's previous query behaviour.

9. The method according to claim 6, wherein viewing the media items comprises showing an array of media items and at least said first and second clusters, wherein the media items inside the cluster in question are viewed after selecting the cluster in question.

10. The method according to claim 1, wherein the method is a client-side method.

11. The method according to claim 1, wherein said first descriptive information is the location of a terminal containing the media items.

12. The method according to the claim 11, where the location of the terminal containing the media items is automatically acquired from a positioning system or manually defined by the user.

13. The method according to claim 1, wherein said second descriptive information is the time of acquiring the media item.

14. The method according to claim 1, wherein the media item is an image.

15. A computer program product for managing media items, wherein the computer program product comprises a readable memory, a computer program stored in said readable memory, wherein the computer program comprises instructions executable on a process for providing individual media items with metadata comprising at least first and second descriptive information;

forming a first cluster of individual media items that have one descriptive information in common;

forming a second cluster of individual media items that have two descriptive information in common;

automatically sub-clustering together media items within a cluster in question when said media items within said cluster in question have further descriptive information in common;

providing a cluster hierarchy comprising at least the first and second clusters and any sub-clusters; and presenting each cluster and any sub-clusters as an individual media item to a user interface.

*16. The method according to claim 1, wherein providing the individual media items comprises searching.*

*17. The computer program product according to claim 15, wherein the computer program further comprises instructions, that when executed by a data processing unit, cause an apparatus to perform comparing a first individual media item to a plurality of individual media items or to at least said first and second clusters for determining whether to cluster said first individual media item with at least one of said plurality of individual media items or at least one of said first and second clusters.*

*18. The computer program product according to claim 15, wherein the computer program further comprises instructions, that when executed by a data processing unit, cause an apparatus to perform naming the cluster in question according to descriptive information the individual media items of the cluster in question have in common.*

*19. The computer program product according to claim 18, wherein the cluster in question is named and updated manually, wherein the name is also updated to the corresponding storage system.*

*20. The computer program product according to claim 15, wherein the computer program further comprises instructions, that when executed by a data processing unit, cause an apparatus to perform displaying the cluster in question among the individual media items, but differentiated from the individual media items visually.*

*21. The computer program product according to claim 15, wherein the computer program further comprises instructions, that when executed by a data processing unit, cause an apparatus to perform managing media items and at least said first and second clusters, wherein managing comprises at least arranging, querying and viewing the media items.*

*22. The computer program product according to claim 21, wherein querying the media items comprises defining a first entry for one descriptive information wherein a next entry is based on at least one subsequent descriptive information of media items fulfilling the first entry.*

*23. The computer program product according to claim 22, wherein querying the media items is adapted automatically based on a user's previous query behavior.*

*24. The computer program product according to claim 21, wherein viewing the media items comprises showing an array of media items and at least said first and second clusters, wherein the media items inside the cluster in question are viewed after selecting the cluster in question.*

*25. The computer program product according to claim 15, wherein the computer program is a client-side computer program.*

*26. The computer program product according to claim 15, wherein said first descriptive information is the location of a terminal containing the media items.*

*27. The computer program product according to the claim 26, where the location of the terminal containing the media items is automatically acquired from a positioning system or manually defined by the user.*

*28. The computer program product according to claim 15, wherein said second descriptive information is the time of acquiring the media item.*

*29. The computer program product according to claim 15, wherein the media item is an image.*

*30. The computer program product according to claim 15, wherein providing the individual media items comprises searching.*

* * * * *